United States Patent [19]
Kandathil

[11] 3,833,393
[45] Sept. 3, 1974

[54] FABRIC-STIFFENING COMPOSITION AND PROCESS
[75] Inventor: Thomas V. Kandathil, Racine, Wis.
[73] Assignee: S. C. Johnson & Son, Inc., Racine, Wis.
[22] Filed: Oct. 2, 1972
[21] Appl. No.: 294,040

Related U.S. Application Data
[63] Continuation of Ser. No. 88,130, Nov. 9, 1970, abandoned, which is a continuation-in-part of Ser. No. 721,191, April 15, 1968, abandoned.

[52] U.S. Cl. ........ 106/212, 117/139 CQ, 117/139 C
[51] Int. Cl....C08b 27/36, C08b 27/42, C08b 25/00, C08b 27/46
[58] Field of Search ............ 106/271, 10, 212, 213; 117/139.5 C

[56] References Cited
UNITED STATES PATENTS
3,181,961  5/1965  Katzbeck .......................... 106/213
3,395,028  7/1968  Mackles ............................. 106/10
3,450,599  6/1969  Schaufelberger ............... 117/143 R
3,562,158  2/1971  Varsanyi ............................. 106/10

Primary Examiner—Theodore Morris
Attorney, Agent, or Firm—Joseph T. Kivlin

[57] ABSTRACT

The disclosure relates to fabric-stiffening compositions comprising a fabric-stiffening agent (such as starch), an organic solvent with high penetrating ability, and an emulsifiable wax. These compositions may also contain additional components, such as a water-soluble polyalkylene glycol, a salt of a water-soluble amine and a fatty acid, or a silicone. These compositions can also be pressurized.

4 Claims, No Drawings

FABRIC-STIFFENING COMPOSITION AND PROCESS

This application is a continuation of Kandathil U.S. Ser. No. 88,130, filed Nov. 9, 1970, which in turn is a continuation-in-part of Kandathil U.S. Ser. No. 721,191, filed Apr. 15, 1968 both now abandoned.

This invention relates to novel compositions for imparting body and stiffness to textile materials. More specifically, this invention relates to pressurized spray starch compositions.

Stiffening agents and the like are frequently used on textile materials (such as items of wearing apparel) in order to improve the appearance, body, and wearing qualities of such materials. For example, natural starches and synthetic equivalents thereof are employed to treat such articles as shirts, dresses, blouses, etc. The crisp hand, smooth appearance, full body, and form-retaining characteristics imparted by such treatment are desired by consumers and have led to an increasing demand for fabric-stiffening products. Such products are generically referred to as "laundry starches," although they may contain other stiffening agents in addition to, or in place of, natural or synthetic starches.

Conventionally, laundry starches are applied by soaking or sprinkling the fabric with the desired composition, followed by the application of heat and pressure to smooth and dry the fabric and to form any desired creases or pleats. The development of laundry starches which could be sprayed, either mechanically or by self-pressurization, on the fabric greatly facilitated the application, especially in areas of home use. Sprayable formulations permit small areas of fabric to be selectively treated in a convenient manner. However, the use of sprayable compositions also gave rise to new problems. The most serious of these problems is the fact that a spray application is predominantly a surface treatment, and the stiffening agent does not penetrate the fibers. Thus, most of the stiffening agent is present as a surface coating. As a result, the maximum improvement in body and hand is not realized, and the finish flakes off severely and builds up on the sole-plate of the iron. These problems are especially aggravated when treating fabrics containing synthetic fibers since such materials are not readily wetted by conventional formulations and do not, therefore, wick the finish into the fibers. Furthermore, prior art sprayable compositions are frequently characterized by clogging of spray orifices, resulting in poor spray, dripping, and uneven treatment.

It is an object of the present invention to provide novel fabric-stiffening compositions which are chracterized by their ability to penetrate rapidly into the fibers of the treated fabric. It is a further object to provide fabric-stiffening compositions which are particularly suited to spray application. Other objects will be apparent to those skilled in the art from the following description.

The compositions of this invention contain at least one fabric-stiffening agent, an organic solvent having high penetrating ability, and an emulsifiable wax. This novel combination provides rapid wetting-out of the treated fabric and penetration of the stiffening agent into the individual fibers. Thus, a uniform treatment is achieved and surface coating, flaking, and iron-buildup are minimized. The compositions also are non-clogging and are, therefore, highly convenient to use.

These fabric-stiffening compositions will also contain water as the principal carrier or diluent for the formulation. In preferred embodiments, the composition will be in the form of a water-out emulsion wherein the water-soluble components are dissolved in the continuous aqueous phase and the water-insoluble components are dispersed therein by emulsification.

It is preferred that starch constitute at least a portion of the stiffening agent of the composition because of its comparatively low cost and commerical availability. The starch may be any of the naturally occurring materials derived from rice, wheat, corn, tapioca, or the like. It may also be a modified starch such as solubilized dextrinized, precooked, or oxidized starches. Preferably, the starch will be one which can be dispersed in water. In general, it is found that the amount of starch in the formulation can suitably range from about 0.5 percent to about 6 percent, by weight, and preferably from about 2 percent to 4 percent, by weight. The precise amount chosen will depend primarily upon the degree of stiffness desired and the nature of the other components of the formulation.

These compositions also contain at least one emulsifiable wax to enhance the body of the fabric and also contribute to lubricity. The term "Emulsifiable" is used to indicate that the wax, although insoluble in water, may be emulsified therein to obtain an aqueous dispersion. The emulsifiable wax can be any predominantly hydrocarbon aliphatic material of high molecular weight, such as natural and synthetic waxes. (The term "predominantly" is used to indicate that the wax may contain minor amounts of atoms other than carbon and hydrogen and minor amounts of aromatic and cycloaliphatic materials.) Examples of suitable natural waxes are plant, animal, and insect waxes. Preferred natural waxes include carnauba, palm, candelilla, sugar cane, japan, esparto, and fir bark waxes; beeswax; and spermaceti, Chinese insect, and shellac waxes.

Suitable synthetic waxes include microcrystalline and petroleum waxes. Preferred synthetic waxes are the polyolefin waxes, such as polyethylene, polypropylene, copolymers of ethylene and propylene, and copolymers of ethylene and acrylic acid. Suitable synthetic waxes are commercially available under the trade designation AC 392, 394, 540, and 629 from Allied Chemical Company and under the trade designation Epolene E–10, E–11, E–12, E–14, E–15, E–16, and E–45 from Eastman Chemical Products, Inc.

It is desirable for the wax to be emulsifiable in order to facilitate its incorporation in the composition. A preferred emulsifiable wax is oxidized polyethylene. Generally, the emulsifiable wax will constitute from about 0.1 percent to about 5 percent, by weight, of the formulation, and preferably from about 0.5 percent to about 1 percent. These ranges may, however, be varied somewhat to meet particular requirements in the product.

These compositions will also preferably contain at least one water-soluble polyalkylene glycol which contributes enhanced body and lubricity to the fabric and helps prevent clogging. The most suitable polyalkylene glycols are the normally solid polyalkylene glycols containing two to three carbon atoms per alkylene group. Illustrative preferred materials are polyethylene glycols and polypropylene glycols having molecular weights of about 600 to about 12,000. The polyalkylene glycol will normally be present in the amount of about 0.1 to about 2 percent, by weight, of the formulation, and

TABLE I

PENETRATION OF FABRICS

| Solvent | Cotton | | Dacron-Cotton (65:35) | | Dacron-Cotton (50:50) | |
|---|---|---|---|---|---|---|
| | Time | Volume | Time | Volume | Time | Volume |
| Isopar (Cosmetic Grade) | 2 | 5 | 2 | 4 | 1 | 1 |
| Isopar C | 3 | 6 | 2.7 | 5 | 2 | 4 |
| Isopar E | 3 | 5 | 3 | 5 | 2 | 4 |
| Isopar G | 3 | 5 | 2 | 3 | 1.3 | 1.5 |
| Isopar H | 4 | 6 | 2.7 | 5 | 0.7 | 0.5 |
| Isopar K | 2 | 5.8 | 2 | 4 | 0.7 | 0.5 |
| Isopar L | 2 | 5 | 2 | 4 | 1 | 1 |
| Isopar M | 1.3 | 2.4 | 0.7 | 0.8 | 0.3 | 0.3 |
| Isopar O | 0.5 | 1.6 | 0.5 | 1.6 | 0.1 | 0.3 |
| Cyclo-hexane | 4 | 12 | 3 | 6.5 | 2 | 4 |
| n-hexane | 12 | 16 | 6 | 8 | 3 | 4 |
| n-pentane | 16 | 20 | 16 | 20 | 16 | 20 | preferably from about 0.3 percent to about 0.7 percent.

It has been found desirable to include in the compositions of the invention at least one salt of a water-soluble amine and a fatty acid. These salts aid in the emulsification of the emulsifiable wax and also appear to promote an interaction of the polyalkylene glycol with the emulsifiable wax, particularly oxidized polyethylene. This interaction adds considerably to the enhancement of body and stiffness of the treated fabric. The amine salt may be added as such or may be formed in situ by adding separately the amine and the fatty acid.

As the amine portion of the salt, there can be used any convenient water-soluble amine, including primary, secondary, and tertiary amines. The preferred amines are the lower aliphatic and cycloaliphatic amines such as t-butylamine, isopropylamine, monoethanolamine, diethanolamine, di-n-butyl-amine, triethylamine, triethanolamine, morpholine, 1-dimethylmorpholine, 2,4-dimethylmorpholine, etc. Morpholine is especially preferred.

The acid portion of the salt will be derived from a fatty acid, i.e., an aliphatic monocarboxylic acid of about 12 to about 22 carbon atoms. Examples of suitable fatty acids include lauric, myristic, palmitic, stearic, oleic, behenic, and tall oil fatty acids. Stearic acid is especially preferred.

The amount of fatty acid added will generally be an amount sufficient to produce from about 0.2 percent to about 3 percent, by weight, of the amine salt in the formulation, and preferably about 0.4 percent to 0.7 percent. It is preferred that the amine be present in a slight excess, of the order of about 10 percent, over the stoichiometric amount required to form the salt with the acid present.

An especially essential component of these compositions is an organic solvent having good penetrating ability for the fabric to be treated. The combination of this solvent with the other essential components hereinbefore noted is believed to contribute significantly to uniform treatment, and minimum flaking and buildup observed with the compositions of the invention.

Evaluation of penetrating ability is a matter of relatively simple testing, and the solvents useful in the invention will be readily determined. As a cnvenient test for assessing the penetrating qualities of a given organic solvent, a small sample, say a six-inch square, of test fabric is suspended in a frame and the solvent to be evaluated is placed in a burette, the tip of which is two inches above the fabric. The frame is placed in a confined chamber containing air saturated with the test solvent. The solvent is dropped slowly onto the fabric surface at the rate of about 1–3 ml. per minute, and the time and volume of solvent required for penetration of the first drop of solvent through the fabric is noted. A solvent is considered useful if penetration is accomplished in less than about 20 minutes and with less than about 25 ml. of solvent. However, preferred solvents will penetrate the fabric in less than about 5 minutes and will require less than about 10 ml. of solvent. An illustrative table of results obtained with cotton, 65:35 Dacron polyester-cotton and 50:50 Dacron-cotton, all of equal weight and thickness, is shown below. The table includes a number of isoparaffinic solvents sold under the trademark Isopar by Humble Oil and Refining Company. Penetration time is given in minutes, and solvent volume is given in milliliters.

In general, the solvent will desirably be substantially immiscible with water but capable of being dispersed therein by emulsification. The most suitable solvents are hydrocarbon solvents which may be either aromatic, aliphatic, or cycloaliphatic in nature. Examples of suitable solvents are benzene, toluene, xylene, ethyl benzene, terpenes (e.g., gum turpentine, wood turpentine, dipentene, and pine oil), naphtha (e.g., VM&P naphtha), n-pentane, n-hexane, n-heptane, cyclohexane, and the isoparaffinic solvents sold under the trademark Isopar. Mixtures of these solvents can be used. These solvents have a general boiling point range from about 95° to about 410°F. and preferably from about 175° to about 410°F.

Especially preferred are the Isopar solvents having a boiling point range from about 240° to about 410°F. Although the Isopar solvents are composed predominantly of isopariffinic compounds, they may contain minor amounts of aromatic and/or cycloaliphatic compounds.

In order to reduce problems of toxicity and objectionable odor, it is most preferred to employ solvents characterized by low odor and toxicity, especially the Isopar solvents and particularly Isopar Cosmetic Grade having a boiling point range of about 370° to about 410°F.

It is generally contemplated that the penetrating solvent will be present in the amount of about 0.5 percent to about 10 percent, by weight, of the composition, and preferably about 1.5 percent to 8 percent. In preferred embodiments of the invention, the composition will be an oil-in-water emulsion wherein the solvent is present in the emulsified oil phase.

The compositions may also contain one or more of a number of optional ingredients such as perfumes or scents, optical brighteners, bactericides, antistatic agents, emulsifiers, wetting agents, corrosion inhibitors, preservatives, ironing aids, and the like. In particular, it is desirable to incorporate an ironing aid to improve the ease of ironing. The most commonly employing ironing aids are silicones having good release properties (such as dimethyl silicone fluids, methylphenyl silicones, amine-modified silicones, etc.). Such materials are commercially available in a number of forms. It is generally preferred that an emulsified silicone be employed, but non-emulsified materials can be dissolved in a suitable solvent and incorporated into an emulsion formulation.

It will be readily understood that all components of the formulation should be as free as practically possible of undesirable colors and odors so that there will be no objectionable residue on the treated fabric.

The preferred compositions are oil-in-water emulsions wherein such water-soluble materials as starch and polyalkylene glycol are in the continuous aqueous phase, and such water-insoluble materials as emulsifiable wax, silicone, and organic solvent are in the dispersed oil phase. These formulations can be applied by means of a mechanical pump sprayer or by soaking, sprinkling, or swabbing the fabric.

Most preferably, these compositions will be formulated as self-pressurized compositions which can be dispensed from pressurized containers as wet, surface-type sprays. Pressurization can be accomplished by adding to the above-described compositions an inert gas (such as carbon dioxide or nitrous oxide) or a liquefied normally gaseous propellant (such as the hydrocarbon and fluorinated hydrocarbon propellants). The preferred liquefied normally gaseous hydrocarbon propellants include propane, butane, isobutane, and isopentane. The preferred fluorinated hydrocarbons include chlorodifluoromethane, 1,1-difluoroethane, dichlorodifluoromethane, trichlorofluoromethane, and the like. Preferably, the propellant will be one of the aforementioned liquefied normally gaseous propellants and will be present in the oil phase of the emulsion. The amount of propellant employed will be an amount at least sufficient to expel the entire contents of the container. The use of very large amounts of propellant or very high container pressure is undesirable since such conditions lead to the production of fine space sprays rather than the desired wet sprays. In general, the propellant will be of the order of 3 percent to 10 percent of the total formulation, and the can pressure will be up to about 50 pounds per square inch gauge (psig), and preferably up to about 40 psig.

A typical method of formulating a composition of the invention is as follows. A portion, say 10 to 30 percent, of the starch is dissolved in water heated almost to the boil. The solution is cooled slightly, and the remainder of the starch is dispersed therein. The polyalkylene glycol and a portion, say 20 to 40 percent, of the fatty acid are then added and uniformly dispersed. In a separate container, the emulsifiable wax is melted and blended with the remainder of the fatty acid and all of the water-soluble amine. To the wax mixture there is added the penetrating solvent and silicone. The wax mixture is then cooled to below the boiling point of water and is added slowly, with good agitation, to the starch solution. The resulting emulsion is then allowed to cool. If the product is to be pressurized, the above formulation is placed in a suitable container, and the propellant is added thereto. In the case of liquefied normally gaseous propellants, the container can be agitated to aid the emulsification of the propellant.

Practice of certain illustrative embodiments can be observed from the following specific examples. It will be understood, however, that the invention is not limited to the materials and conditions specified but comprehends all such modifications and variations as fall within the general scope, as hereinbefore described.

EXAMPLES 1–4

Compositions are prepared as follows, using the materials identified in the noted amounts, in percent by weight:

| | Examples 1 & 2 | Examples 3 & 4 |
|---|---|---|
| Starch | 3.00 | 3.00 |
| Polyethylene glycol | 0.50 | 0.50 |
| Fatty acid | 0.30 | 0.30 |
| Silicone | 0.50 | 0.50 |
| Isoparaffinic solvent | 2.00 | 2.00 |
| Preservative | 0.025 | 0.025 |
| Fragrance | 0.015 | 0.015 |
| Deionized water | 90.90 | 90.21 |
| Emulsifiable wax | 2.76 | 3.45 |

In each case, the starch is the partially oxidized, hot water-soluble corn starch sold under the trademark CB 5541 by Corn Products Co.; the polyethylene glycol has a molecular weight of 3,000–3,700 and is sold under the trademark Carbowax 4000 by Union Carbide; the fatty acid is the 53:45:5 mixture of palmitic, stearic, and other fatty acids sold under the trademark Emersol 132 by Emery Industries; the silicone is the 35% by weight aqueous emulsion of 60,000 centistoke viscasil dimethyl silicone sold under the trademark Sm 2061 by General Electric; the isoparaffinic solvent is Isopar Cosmetic Grade; and the preservative is the 20 percent, by weight, dispersion of chloromethoxypropyl mercuric acetate sold under the trademark Troysan C 20 by Troy Chemical Company. The emulsifiable waxes are as follows:

EXAMPLE 1

Anionic-nonionic emulsion containing 25 percent, by weight, of oxidized polyethylene having a molecular weight of about 3,000, a melting point of 280°–287°F., and an acid number of about 56; sold under the trademark AC394 by Allied Chemical Company. The emulsifier used is the polyethoxylated alkyl phenol sold under the trademark Triton X–100 by Rohm and Haas Company.

EXAMPLE 2

Nonionic emulsion containing 25 percent, by weight, of emulsified polypropylene sold under the trademark Valspex P167 by Valchem Chemical Division of United Merchants and Manufacturers, Inc.

EXAMPLE 3

Anionic emulsion containing 20 percent, by weight, of a mixture of:

i. 3.5 percent montan wax having a melting point of 172°–182°F. and an acid number of 25–35; sold under the trademark KSL by Farbwerke Hoechst AG;

ii. 6.7 percent emulsifiable ethylene-acid copolymer having a molecular weight of about 3,000, a melting point of about 226°F., and an acid number of about 40; sold under the trademark AC540 by Allied Chemical Company; and iii. 7.8 percent petroleum wax having a melting point of 200°–210°F. and an acid number of about 6.5–8.5; sold under the trademark Petrolite C8500 by Farbwerke Hoechst AG. The emulsifier used is diethylaminoethanol tallate.

EXAMPLE 4

Anionic emulsion containing 20 percent, by weight, of polyethylene having a molecular weight of 1,500–2,000, a melting point of 213°–221°F., and an acid number of 14–17; sold under the trademark AC629 by Allied Chemical Company, the emulsifier being diethylaminoethanol tallate.

Each of the above compositions is placed in an aerosol container and pressurized with an 83:17 blend of isobutane and propane in the ratio of 5 parts, by weight, of propellant blend to 95 parts, by weight, of the unpressurized composition. The pressurized compositions are applied to samples of two test fabrics — a cotton fabric and a 65:35 Dacron-cotton blend fabric, and the fabric is ironed with a conventional electric iron.

When applied to either cotton or Dacron-cotton, the formulations of Examples 1 and 2 produce excellent starched finishes with no flaking, no build-up on the iron, no scorching, and stiffness comparable to a conventionally applied starch. The formulation of Example 4 produces essentially identical results except for a slight amount of flaking on the Dacron-cotton blend. The formulation of Example 3 gives no build-up on the iron, no scorching, only slight flaking, and good stiffness on both test fabrics.

EXAMPLES 5–7

Compositions are prepared as follows, using the materials identified in the noted amounts, in percent by weight:

| | |
|---|---|
| Starch | 3.00 |
| Emulsifiable wax | 3.45 |
| Polyethylene glycol | 0.50 |
| Fatty acid | 0.30 |
| Silicone | 0.50 |
| Isoparaffinic solvent | 2.00 |
| Preservative | 0.025 |
| Fragrance | 0.015 |
| Deionized water | 90.21 |

The emulsifiable wax is an anionic emulsion containing 20 percent, by weight, polyethylene having a molecular weight of about 1,500–2,000, a melting point of 213°–221°F., and an acid number of 14–17; sold under the trademark AC629 by Allied Chemical Company, the emulsifier being morpholinium stearate. The starch, polyethylene glycol, silicone, isoparaffinic solvent, and preservative are as in Example 1. The fatty acids employed are:

Example 5 — lauric acid
Example 6 — oleic acid
Example 7 — tall oil fatty acid

Each of the above compositions is placed in an aerosol container and pressurized with isobutane in the ratio of 5 parts, by weight, isobutane to 95 parts, by weight, of unpressurized composition. The pressurized formulations are then tested by the procedure described in Examples 1–4.

The formulations of Examples 6 and 7 produce excellent starched finishes on both test fabrics, with no flaking, no build-up on the iron, no scorching, and stiffness comparable to that of a conventionally applied starch. The formulation of Example 5 gives essentially identical results except for a slight amount of flaking on the Dacron-cotton fabric.

EXAMPLES 8–11

Compositions are prepared as follows, using the materials identified in the noted amounts, in percent by weight:

| | |
|---|---|
| Starch | 3.00 |
| Emulsifiable wax | 3.45 |
| Penetrating solvent | 2.00 |
| Polyethylene glycol | 0.50 |
| Fatty acid | 0.30 |
| Silicone | 0.50 |
| Preservatives | 0.025 |
| Fragrance | 0.015 |
| Deionized water | 90.21 |

The emulsifiable wax is the same as that employed in Example 5. The starch, polyethylene glycol, fatty acid, silicone, isoparaffinic solvent, and preservative are those employed in Example 1. The penetrating solvents are as follows:

Example 8 n-pentane
Example 9 n-hexane
Example 10 cyclohexane
Example 11 n-heptane Each of the compositions is pressurized in accordance with the procedure of Example 5 and tested as above. When applied to cotton, each of the formulations produces an excellent starched finish with no flaking, no build-up on the iron, no scorching, and stiffness comparable to a conventionally applied starch. When applied to the Dacron-cotton fabric, these formulations performed satisfactorily but gave slightly more flaking than the best formulations in which the penetrating solvent was an isoparaffinic solvent.

EXAMPLES 12–14

Compositions are prepared as follows, using the materials identified in the amounts noted, in percent by weight:

| | |
|---|---|
| Starch | 3.00 |
| Emulsifiable wax | 2.76 |
| Amine | 1.30 |
| Isoparaffinic solvent | 2.00 |
| Polyethylene glycol | 0.50 |
| Fatty acid | 0.30 |
| Silicone | 0.50 |
| Preservative | 0.025 |
| Fragrance | 0.015 |
| Deionized water | 90.77 |

The starch, emulsifiable wax, polyethylene glycol, fatty acid, isoparaffinic solvent, silicone, and preservative are as employed in Example 1. The amines used are as follows:

Example 12 — ethanolamine
Example 13 — triethanolamine

Example 14 — methoxypropylamine

Each of the compositions is pressurized as in Example 5 and tested as described above. When applied to either cotton or Dacron-cotton, each of the formulations produces an excellent starched finish with no flaking, no build-up on the iron, no scorching, and stiffness comparable to a conventionally applied starch.

EXAMPLES 15–17

Compositions are prepared as follows, using the materials identified in the noted amounts, in percent by weight:

| | |
|---|---|
| Starch | 3.00 |
| Emulsifiable wax | 3.45 |
| Isoparaffinic solvent | 2.00 |
| Polyethylene glycol | 0.50 |
| Fatty acid | 0.30 |
| Silicone | 0.50 |
| Preservative | 0.025 |
| Fragrance | 0.015 |
| Deionized water | 90.21 |

The emulsifiable wax is as used in Example 5. The isoparaffinic solvent, polyethylene glycol, fatty acid, silicone, and preservative are as in Example 1. The starches employed are as follows:

Example 15 — The dextrinized, hydrolyzed cooked corn starch sold under the trademark Laurel Brand Instant Starch B771 by Corn Products Company.

Example 16 — The thin boiling, hot water-dispersible hydroxyethylated milo starch sold under the trademark Tenofilm Starch 6771 by Corn Products Company.

Example 17 — The thin boiling, hot water-dispersible hydroxyethylated milo starch sold under the trademark Tenofilm Starch 6741 by Corn Products Company.

Each of the above formulations is pressurized in accordance with the procedure of Example 5 and tested as described above. When applied to either test fabric, the formulation of Example 15 produces an excellent starched finish with no flaking, no build-up on the iron, no scorching, and stiffness comparable to conventionally applied starch. The formulations of Examples 16 and 17 give essentially identical results except for a slight amount of flaking on the Dacron-cotton fabric.

EXAMPLE 18

A composition is prepared as follows, using the materials identified in the noted amounts, in parts by weight:

| | |
|---|---|
| Starch | 3.00 |
| Emulsifiable wax | 3.45 |
| Penetrating solvent | 6.00 |
| Polyethylene glycol | 0.50 |
| Fatty acid | 0.30 |
| Silicone | 0.50 |
| Preservative | 0.025 |
| Fragrance | 0.015 |
| Deionized water | 86.21 |

The polyethylene glycol, fatty acid, silicone, and preservative are those employed in Example 1. The emulsified wax is the same as that employed in Example 5. The starch employed is the partially oxidized, hot water-dispersible corn starch sold under the trademark Nalex 50–47–3050 by National Starch and Chemical Company. The composition is pressurized in accordance with the procedure of Example 5 to give a pressurized fabric-stiffening spray finish with excellent penetrating characteristics.

EXAMPLE 19

A composition is prepared as follows, using the materials identified in the noted amounts, in parts by weight:

| | |
|---|---|
| Starch | 3.500 |
| Emulsifiable wax | 4.313 |
| Penetrating solvent | 2.000 |
| Silicone | 0.600 |
| Corrosion inhibitor | 0.100 |
| Perfume | 0.015 |
| Preservative | 0.025 |
| Bacteriocide | 0.050 |
| Deionized water | 89.397 |

The 3.500 parts of starch consists of 3.000 parts modified corn starch sold under the trademark Nalex 50–47–3050 and 0.500 parts modified corn starch sold under the trademark Instant Starch B–771 by Corn Products Company. The emulsifiable wax is the same as that employed in Example 5. The penetrating solvent is Isopar Cosmetic Grade, and the corrosion inhibitor is sodium nitrite. The silicone and preservative are the same as those employed in Example 1. The perfume is sold under the trademark PA 15168 by Guivadan Corporation. The vacteriocide is a blend of hexachlorophene and o-phenylphenol and is sold under the trademark Socci 6618 by Scientific Compounding Company. This composition is pressurized in accordance with the procedure of Example 5. This pressurized composition provides excellent fabric-stiffening and penetrating results when tested by the procedure described in Example 1.

Although this invention has been described in detail with particular reference to preferred embodiments thereof, it will be understood that variations and modifications can be effected within the spirit and scope of this invention as described hereinabove and as defined in the appended claims.

I claim:

1. A fabric-stiffening composition comprising an aqueous dispersion of (A) from about 0.5 percent to about 6 percent, by weight, of at least one water-dispersable starch; (B) from about 0.5 percent to about 10 percent, by weight, of at least one isoparaffinic hydrocarbon solvent having a boiling point from about 240° to about 410° F., which has high penetrating ability, is substantially immiscible in water and is emulsified in said composition; (C) from about 0.1 percent to about 5 percent, by weight, of at least one predominantly hydrocarbon aliphatic emulsifiable water-insoluble wax selected from the group consisting of carnauba, palm, candelilla, sugar cane, Japan, esparto, fir bark, beeswax, spermaceti, Chinese insect, shellac, polyethylene, copolymers of ethylene and propylene, and copolymers of ethylene and acrylic acid waxes; (D) from about 0.2 percent to about 3 percent, by weight, of at least one salt of a water-soluble amine and a fatty acid having from about 12 to about 22 carbon atoms; (E) from about 0.1 percent to about 2 percent, by weight, of a water-soluble polyalkylene glycol having two to three carbon atoms per alkylene group; and (F) about 3 percent to about 10 percent of a liquefied normally gaseous propellant selected from the group consisting of hydrocarbon and fluorinated hydrocarbon propellants to self-pressurize said fabric-stiffening composition.

2. A composition as defined by claim 1 wherein said propellant is emulsified in said composition.

3. A process for stiffening fabric, which process comprises spraying onto said fabric a composition comprising an aqueous dispersion of (A) from about 0.5 percent to about 6 percent, by weight, of at least one waterdispersible starch; (B) from about 0.5 percent to about 10 percent, by weight, of at least one isoparaffinic hydrocarbon solvent which has a boiling point from about 240° to about 410°F., high penetrating ability, is substantially immiscible in water, and is emulsified in said composition; (C) from about 0.1 percent to about 5 percent, by weight, of at least one predominantly hydrocarbon aliphatic emulsifiable water-insoluble wax selected from the group consisting of carnauba, palm, candelilla, sugar cane, japan, esparato, fir bark, beeswax, spermaceti, Chinese insect, shellac, polyethylene, copolymers of ethylene and propylene, and copolymers of ethylene and acrylic acid waxes; (D) from about 0.2 percent to about 3 percent, by weight, of at least one salt of a watersoluble amine and a fatty acid having from about 12 to about 22 carbon atoms; and (E) from about 0.1 percent to about 2 percent, by weight, of a water-soluble polyalkylene glycol having two to three carbon atoms per alkylene group.

4. A process as defined by claim 3 wherein said solvent is emulsified in said composition.

* * * * *